(12) United States Patent
Le Donne et al.

(10) Patent No.: US 10,744,952 B1
(45) Date of Patent: Aug. 18, 2020

(54) SPORTS BAR STORAGE COMPARTMENT

(71) Applicant: GM Global Technology Operations LLC, Detroit, MI (US)

(72) Inventors: Gino M. Le Donne, Lake Orion, MI (US); Dusan Colovic, Warren, MI (US); Randy S. Bugbee, Grand Blanc, MI (US); Jeffrey A. Diegel, South Lyon, MI (US); Mark Pulleyblank, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/257,688

(22) Filed: Jan. 25, 2019

(51) Int. Cl.
| | | |
|---|---|---|
| *B60R 13/01* | (2006.01) | |
| *B60R 9/055* | (2006.01) | |
| *B60R 9/06* | (2006.01) | |
| *B62D 33/023* | (2006.01) | |

(52) U.S. Cl.
CPC .............. *B60R 9/055* (2013.01); *B60R 9/065* (2013.01); *B62D 33/023* (2013.01)

(58) Field of Classification Search
CPC ........ B60R 9/055; B60R 9/065; B62D 33/023
USPC ......................................... 224/328, 402–404
See application file for complete search history.

(56) References Cited

U.S. PATENT DOCUMENTS

| | | | | |
|---|---|---|---|---|
| 5,882,058 A | * | 3/1999 | Karrer ...................... | B60J 7/141 |
| | | | | 280/748 |
| 6,983,968 B2 | * | 1/2006 | Brauer ............... | B62D 33/0207 |
| | | | | 224/405 |
| 7,059,159 B2 | * | 6/2006 | Lanigan ............. | B62D 33/0222 |
| | | | | 292/144 |
| RE42,964 E | * | 11/2011 | Jones ....................... | B65D 7/22 |
| | | | | 264/328.12 |
| 9,132,784 B2 | * | 9/2015 | Harrison ................. | B60R 9/045 |
| 9,314,919 B2 | * | 4/2016 | Harrison .................. | B25H 5/00 |
| 2007/0007785 A1 | * | 1/2007 | Thygesen ................. | B60R 9/00 |
| | | | | 296/37.1 |
| 2010/0301721 A1 | * | 12/2010 | Nebel ..................... | B60R 11/06 |
| | | | | 312/326 |
| 2018/0312115 A1 | * | 11/2018 | Reed ........................ | B60R 9/00 |
| 2019/0374935 A1 | * | 12/2019 | Binder .................... | B01L 1/025 |

* cited by examiner

*Primary Examiner* — Adam J Waggenspack

(57) ABSTRACT

A sports bar storage compartment assembly including a storage compartment, wherein the storage compartment includes a storage compartment wall defining a first side, a second side, a top and a bottom. An opening is defined in the storage compartment wall at the first side of the compartment. In addition, the storage compartment is connected to a support shelf of a first attachment bracket, wherein the first attachment bracket is positioned near the first side of the storage compartment adjacent to the opening. A door is connected to the first attachment bracket and conceals the opening when in a closed position.

20 Claims, 8 Drawing Sheets

SPORTS BAR STORAGE COMPARTMENT

INTRODUCTION

In-cab storage provides a place to store items within pick-up trucks; such spaces may include center consoles, glove, compartments and under-seat storage. However, pick-up trucks often lack secure storage outside of the cab conveniently accessible for storing tools, gloves tow ball inserts, jacks, lug wrenches, tie-down straps, chains lug wrenches, jumper cables, or other items. To provide secure storage places, bed mounted tool boxes may be utilized. However, bed mounted storages solutions may take up volume within the pick-up box bed and interfere with storing other items in the pick-up box bed. In addition, bed mounted tool boxes may require drilling into the side walls of the bed or removal of the sport bar assembly. Thus, while current storage compartments achieve their intended purpose, there is a need for a new and improved system and method for providing exterior storage compartments.

SUMMARY

According to several aspects a sports bar storage compartment assembly includes a storage compartment, wherein the storage compartment includes a storage compartment wall defining a first side, a second side, a top and a bottom. An opening is defined in the storage compartment wall at the first side of the compartment. In addition, the storage compartment is connected to a support shelf of a first attachment bracket, wherein the first attachment bracket is positioned near the first side of the storage compartment adjacent to the opening. A door is connected to the first attachment bracket and conceals the opening when in a closed position.

In an additional aspect of the present disclosure, the first attachment bracket further includes two uprights extending upward from opposing sides of the support shelf.

In another aspect of the present disclosure, the first attachment bracket further includes a cross member joining the two uprights distal from the support shelf.

In another aspect of the present disclosure, the uprights of the first attachment bracket are connected to a sports bar.

In another aspect of the present disclosure, the door is connected to one of the uprights of the first attachment bracket with a hinge.

In another aspect of the present disclosure, the hinge includes a hinge stop configured to stop rotation of the door beyond a first angle from the closed position.

In an additional aspect of the present disclosure, the door includes an exterior panel that defines a periphery and an exterior side wall extending around the periphery, wherein the exterior panel defines a volume.

In another aspect of the present disclosure, a reinforcement panel is located inside the volume, wherein the reinforcement panel defines a periphery and the reinforcement panel includes an interior side wall extending around the reinforcement panel periphery.

In an additional aspect of the present disclosure, a latch is coupled to the door, wherein the storage compartment wall is engage-able by the latch.

In another aspect of the present disclosure, the sports bar storage compartment assembly includes a reinforcement bracket positioned against the storage compartment wall within the storage compartment below the opening and wherein the reinforcement bracket is engage-able by the latch.

In an additional aspect of the present disclosure, a reinforcement bracket is positioned against the storage compartment wall within the storage compartment below the opening, wherein the reinforcement bracket is connected to the bottom of the storage compartment and the support shelf of the first attachment bracket.

In an additional aspect of the present disclosure, the storage compartment wall defines a recess around the opening and down to the bottom of the storage compartment.

In an additional aspect of the present disclosure, a seal is disposed on the storage compartment around the opening, wherein the door contacts the seal when in the closed position.

In an additional aspect of the present disclosure, the storage compartment includes at least two cut-out side walls located between the first side and the second side of the storage compartment and a cut-out ledge formed between the cut-out side walls, wherein the cut-out ledge is lower in height than the top of the storage compartment relative to the bottom of the storage compartment.

In an additional aspect of the present disclosure, the sports bar storage compartment assembly includes a second attachment bracket including a support shelf, wherein the storage compartment is connected to the second attachment bracket near the second side of the storage compartment.

In an additional aspect of the present disclosure, the sports bar storage compartment assembly includes at least one reinforcing upper bracket connected to the top of the storage compartment.

According to several aspects, a vehicle includes a pick-up box, which at least two side walls. In addition, the vehicle includes a sports bar mounted to the two side walls and a storage compartment assembly connected to the sports bar. The storage compartment assembly includes a storage compartment including a storage compartment wall defining a first side, a second side, a top and a bottom. The storage compartment assembly also includes an opening defined in the storage compartment wall at the first side of the compartment. The storage compartment assembly further includes a first attachment bracket including a support shelf, wherein the storage compartment is connected to the support shelf and the first attachment bracket is near the first side and adjacent to the opening. And, the storage compartment assembly yet further includes a door connected to the first attachment bracket, wherein the door conceals the opening when in a closed position.

In another aspect of the present disclosure, the vehicle further includes a rear window, wherein the top of the storage compartment spans across a width of the pick-up box between the two side walls and blocks the rear window.

In another aspect of the present disclosure, the vehicle further includes a rear window and the storage compartment includes at least two cut-out side walls located between the first side and the second side of the storage compartment and a cut-out ledge formed between the cut-out side walls, wherein the cut-out ledge is lower in height than the top of the storage compartment relative to the bottom of the storage compartment, and wherein the storage compartment blocks a portion of the rear window.

According to several aspects, a method of installing a sports bar storage compartment includes removing, if present, a side trim plate connected to a sports bar. The method further includes connecting a first attachment bracket to the sports bar, wherein the first attachment bracket includes a support shelf and a door. The method yet further includes sliding a storage compartment onto the support shelf, wherein the storage compartment includes a top, a bottom, a first side and a second side and defines an opening in the first side, wherein the opening is adjacent to the first attachment bracket. The method also includes connecting the storage compartment to the support shelf proximal to the opening.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
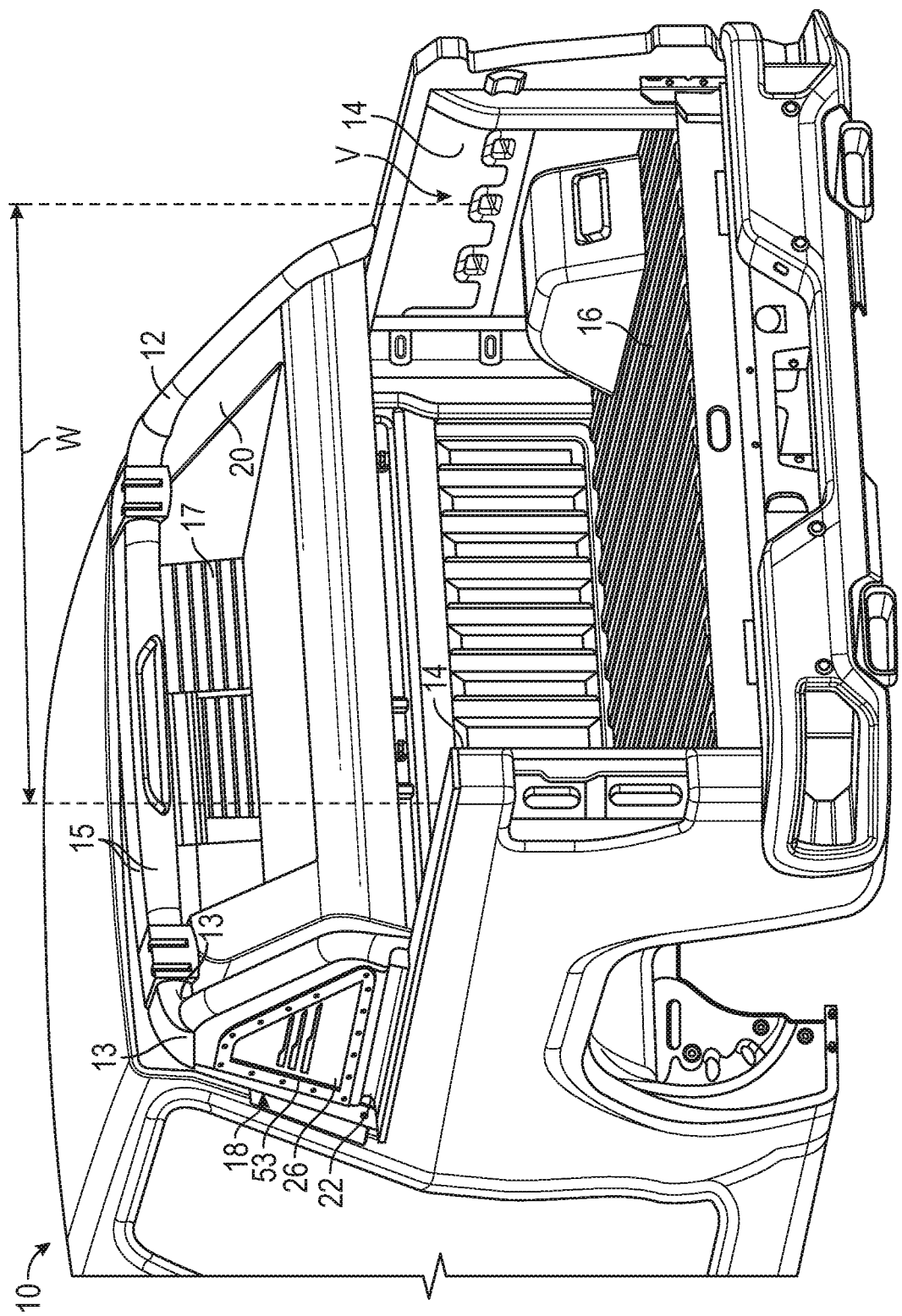
FIG. 1 is a rear perspective view of a truck frame and sports bar storage compartment according to an exemplary embodiment.

The following description is merely exemplary in nature and is not intended to limit the present disclosure, application, or uses.

The terms "top", "bottom", "rear", "front", and "upward" are terms used relative to the orientation of a vehicle 10 as shown in the drawings of the present application. Thus, "top" refers to a direction toward the top of the vehicle, "bottom" refers to a direction toward the bottom of the vehicle, "rear" refers to a direction toward the rear of the vehicle, "front" refers to a direction toward the front of the vehicle. "Upward" refers to a direction toward the top of the vehicle.

FIG. 1 illustrates a vehicle, and in this aspect, a pick-up truck 10 that includes a sports bar 12 mounted to the side walls 14 of the pick-up box 16. A sports bar storage compartment assembly 18, including a storage compartment 20, is mounted to the sports bar 12 by attachment brackets 22, 23 (see also FIG. 2). In the illustrated aspect, the sports bar storage compartment assembly 18 does not enter the volume V defined within the pick-up box 16.

In aspects, the sports bar 12 includes a number of vertical posts 13 connected to, and extending up from, the side walls 14 of the pick-up box 16. The vertical posts 13 may be adjoined together by one or more cross members 15, extending between the side walls 14 of the pick-up box 16. In the illustrated aspect, the sports bar 12 is also located adjacent to the rear window 17 of the truck 10.

Figure 2:
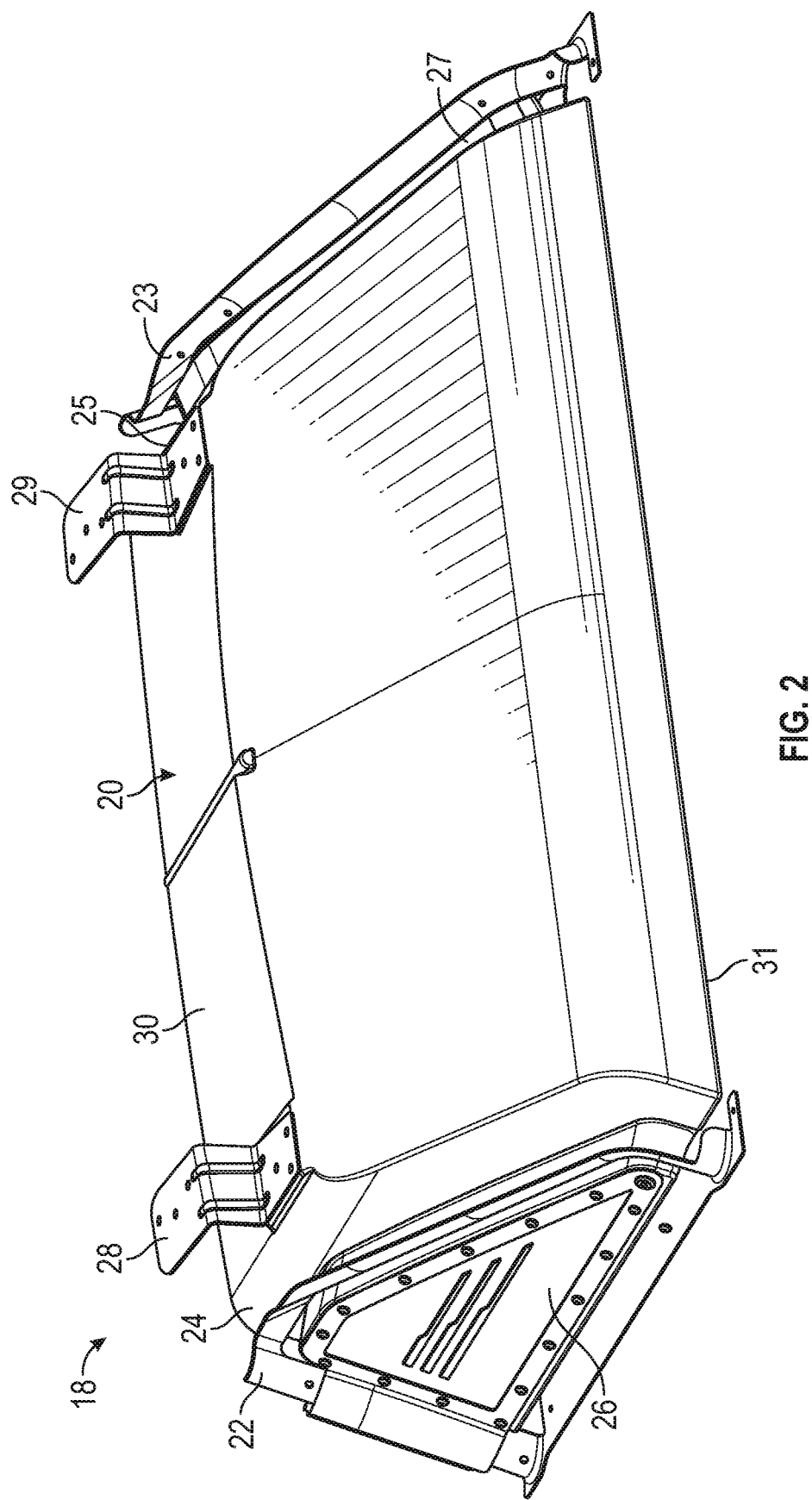
FIG. 2 is a rear perspective view of a sports bar storage compartment according to an exemplary embodiment.

Reference is now made to FIG. 2 illustrating an aspect of a sports bar storage compartment assembly 18. Again, the sports bar storage compartment assembly 18 includes a storage compartment 20, attachment side brackets 22, 23 to connect the storage compartment 20 to the sports bar 12, and one or more doors 26, 27 connected to the attachment brackets 22, 23 located at either or both sides of the storage compartment 20. Further, in aspects, the sports bar storage compartment assembly 18 includes upper brackets 28, 29 located proximal to each side 24, 25 of the storage compartment 20 connecting the top 30 of the storage compartment 20 and sports bar 12 (illustrated in FIG. 1). It may be appreciated that only one attachment bracket, or only one upper bracket may be utilized, depending on the configuration of the sports bar 12 and factors such as the load carrying capacity of the storage compartment 20.

Figure 3:
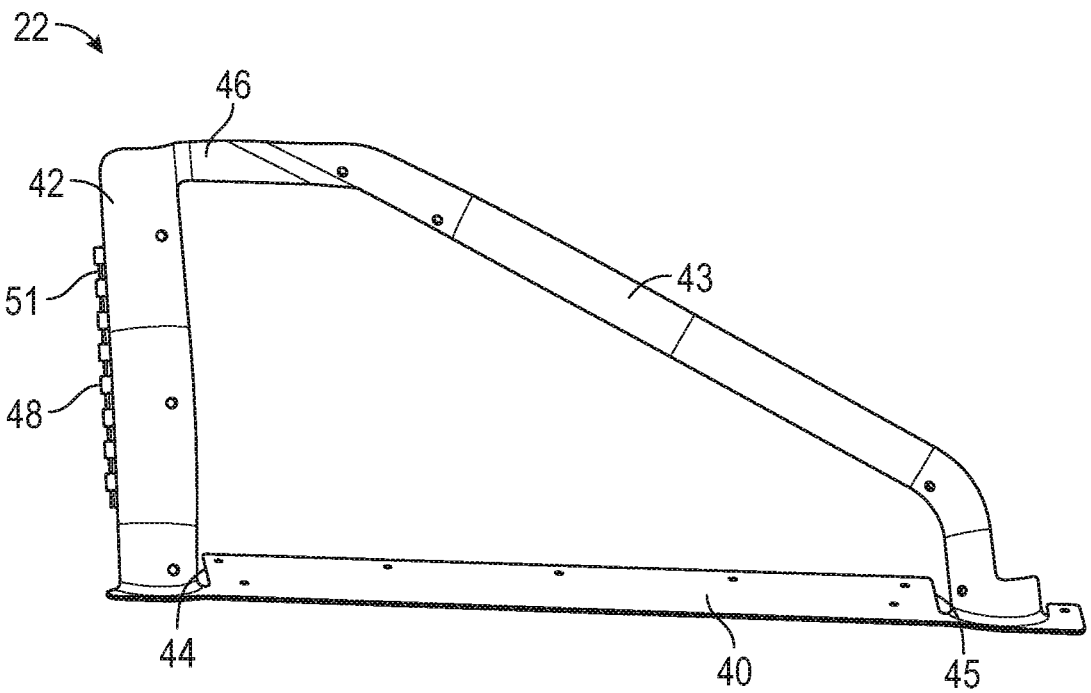
FIG. 3 is an illustration of an attachment bracket according to an exemplary embodiment.

An aspect of the attachment brackets 22, 23 is illustrated in FIG. 3, which depicts one of the two attachment brackets 22. It may be appreciated that the other attachment bracket 23 exhibits the same features as the first attachment bracket 22. The attachment bracket 22 includes a support shelf 40, uprights 42, 43 located at both sides 44, 45 of the support shelf 40, and a cross member 46. It may be appreciated that in some aspects, the cross member 46 may be omitted.

The storage compartment 20 is connected to the support shelf 40 at the bottom 31 and near the side 24 of the storage compartment 20. The support shelf 40 is illustrated as being long enough to extend a portion of the way across the width W of the pick-up box bed 16 volume V, such as across 1% to 20% of the longest width of the pick-up box bed 16 volume V, including all values and ranges therein.

As alluded to above, the uprights 42, 43 are connected to either side of the support shelf 40 and extend upward from opposing sides of the support shelf 40. In aspects, the uprights 42, 43 may not extend up completely vertical from the support shelf 40, i.e., at 90 degrees. In aspects, the uprights 42, 43 are arcuate in shape. It may be appreciated that, in aspects, the angle the uprights 42, 43 extend from the support shelf 40 and the shape of the uprights 42, 43 are complementary to the angles and shape of the existing sports bar 12. Further, in the aspect illustrated, the uprights 42, 43 are joined by a cross member 46 distal from the support shelf 40. The cross member 46 extends between the vertical posts 13 and may not itself be affixed to the vertical posts 13.

Figure 4A:
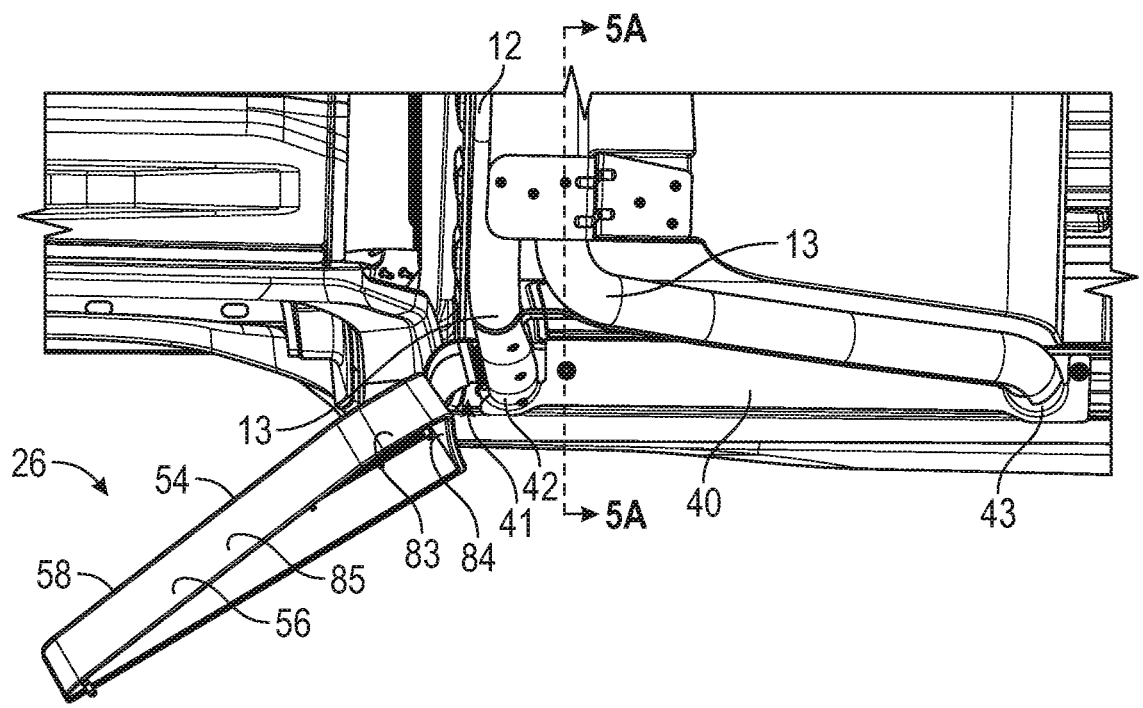
FIG. 4a is a top down view of the sports bar storage compartment with the door in the open position according to an exemplary embodiment.
Figure 4B:
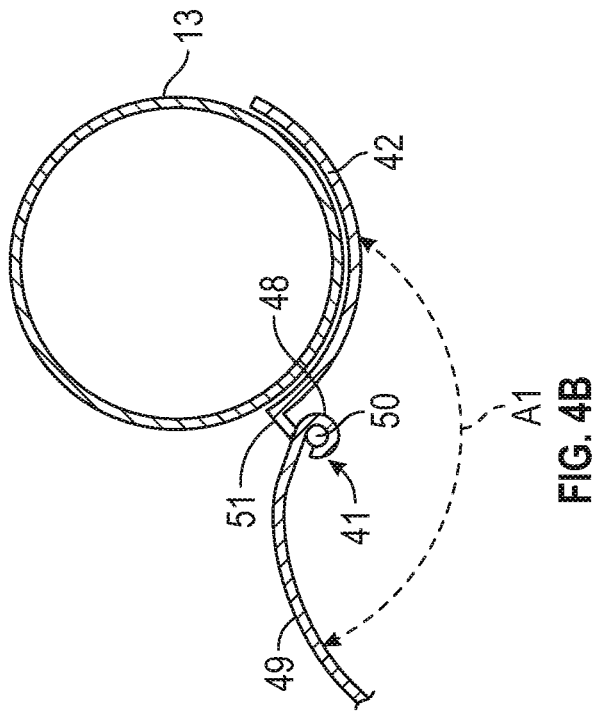
FIG. 4b is a close-up of the top view of the sports bar storage compartment with the door in the open position of FIG. 4a according to an exemplary embodiment.

A description of the doors 26, 27 is provided herein with reference to door 26 and illustrated in FIGS. 4a and 4b. The door 26 has an exterior panel 54 that forms an exterior side wall 56 extending around the periphery 58 of the door 26. The door 26 is affixed to the attachment bracket 22 by a hinge 41. A portion of a hinge 48 for operating the door 26 is illustrated in FIG. 3, wherein the hinge portion 48 extends from an edge of one of the attachment bracket 22 uprights 42. The other portion of the hinge 49 extends out from the exterior panel 54 and periphery 58 of the door 26, as seen in FIGS. 4a and 4b, and mates with the hinge portion 48. As illustrated the hinge portions 48, 49 are secured together with a pin 50.

In the aspect illustrated in FIGS. 3, 4a and 4b, the hinge portion 48 runs vertically along at least a portion of the length of the upright 42 of the attachment bracket 22. In other aspects, the hinge portions 48, 49 may be provided along other portions of the attachment bracket 22 and door 26, respectively. Further, the illustrated hinge arrangement 48, 49 is a piano hinge. Alternatively, other hinges may be used to connect the door to the attachment bracket 22 and similarly provide rotation of the door 26 between an open position and a closed position.

In aspects, a hinge stop 51 is also provided by the hinge portion 48. The hinge stop 51 stops the door from rotating beyond a given angle A1, which may prevent the door 26 from causing damage to the door 26 or other portions of the pick-up truck 10. In aspects, the hinge stop 51 is adjusted to allow the door to pass through 0 to 170 degrees of angular rotation (see angle A1 of FIG. 4b) around the center point of the pin 50 from the closed position, including all values and ranges therein, such as 0 to 150 degrees of rotation. Again, while door 26 was referenced above, it should be appreciated that door 27 (if present) also includes the noted features.

Figure 5B:
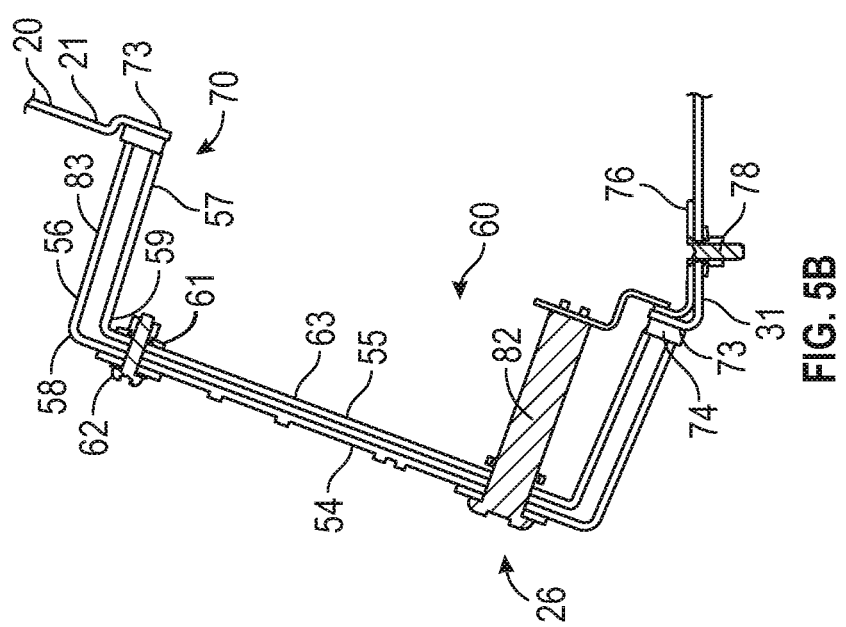
FIG. 5b is a close-up of the cross-section of FIG. 5a illustrating the door construction according to an exemplary embodiment.
Figure 5A:
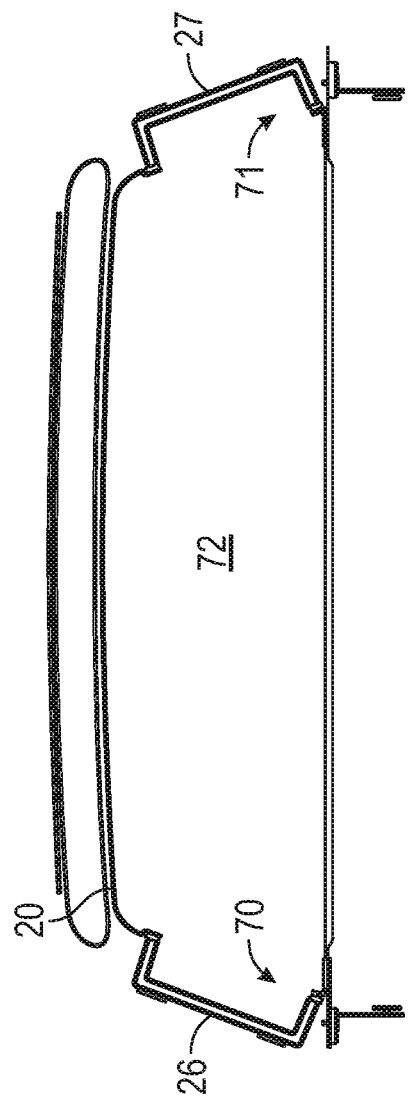
FIG. 5a is cross-section of the sports bar storage compartment according to an exemplary embodiment.

Reference is now made to FIGS. 5a and 5b, which illustrate a cross section of the storage compartment 20 and doors 26, 27 and a close-up of the storage compartment 20 and door 26, respectively. The doors 26, 27 conceal, and even mate with, the openings 70, 71 of the storage compartment 20. As previously noted, the door 26, and likewise door 27, includes an exterior panel 54. The exterior panel 54 includes a periphery 58 and an exterior side wall 56 extending around the periphery 58 of exterior panel 54 of the door 26. The door 26 also includes a reinforcement panel 55 located within the volume 60 of the exterior panel 54. The reinforcement panel 55 also forms an interior side wall 57 around the periphery 59 of the reinforcement panel 55. As illustrated the exterior panel 54 and the reinforcement panel 55 are affixed together by mechanical fasteners 62, which may also secure decorative trim 53 (see FIG. 1) on the exterior panel 54 of the door 26 and a reinforcement strip 61 on the interior 63 of the door 26 (see FIGS. 5b and 7). The mechanical fastener 62 is illustrated to include a nut and bolt; however, other mechanical fasteners may be used as well or in the alternative. It may be appreciated that shelves or other storage pockets (not illustrated) may be provided in the doors 26, 27.

Figure 6:
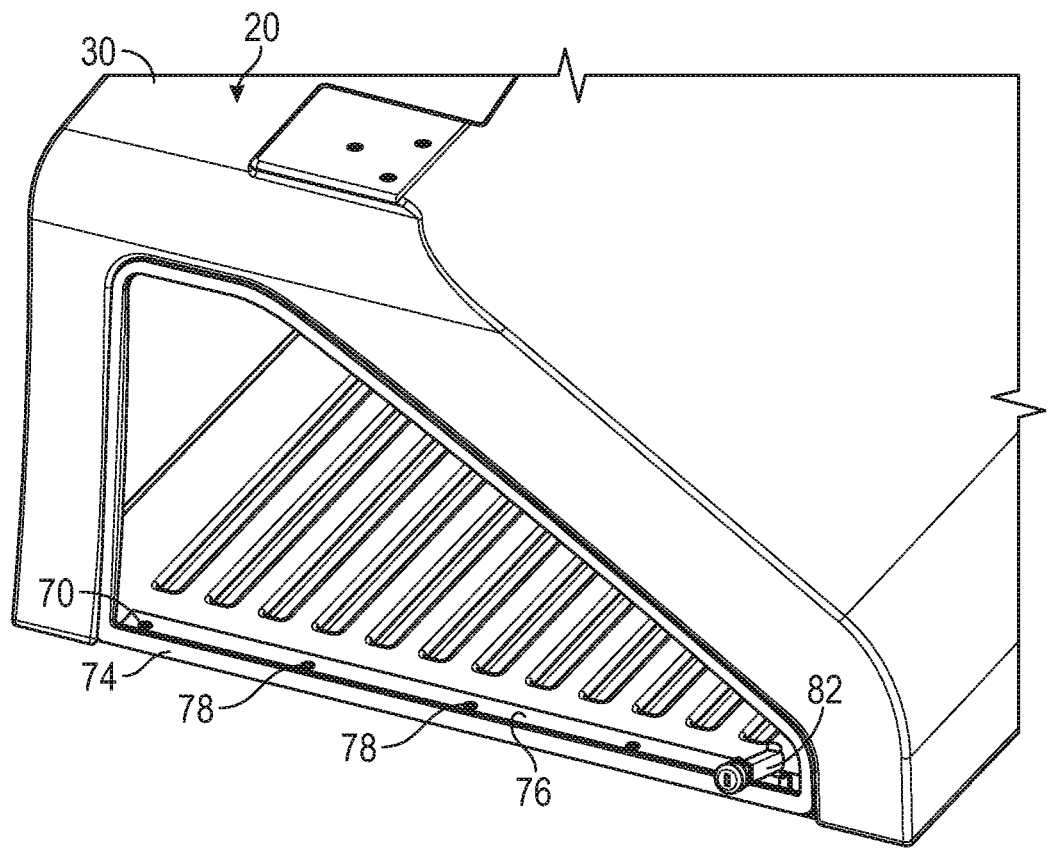
FIG. 6 is a perspective view of the sports bar storage compartment with the door removed according to an exemplary embodiment.

With reference now to FIG. 6, the storage compartment 20 defines one or more openings 70, 71 at either or both sides 24, 25 of the storage compartment 20 (see FIG. 5a) to provide access to the interior volume 72 of the storage compartment 20. The openings 70, 71 are positioned adjacent to the attachment brackets 22, 23 when the storage compartment is connected to the attachment brackets 22, 23.

Turning back to FIG. 5b, a portion 73 of the storage compartment wall 21 is recessed around the openings 70, 71 (not illustrated), which may allow the door 26 to be shingled along the top 83 and sides 84, 85 of the door 26 (see FIG. 4a and FIG. 5b). Further, the recess 73 may extend to the bottom 31 of the storage compartment 20 to allow for water shed. In aspects, one or more seals 74 are disposed on the storage compartment 20 around the opening 70. It may be appreciated that a seal (not illustrated) is additionally or alternatively disposed on the door 26. When closed, the door 26 contacts the seal 74 and the seal 74 is sandwiched between the door 26 and storage compartment wall 21. In further aspects, the seal 74 is a die cut seal, formed from a thermoplastic elastomer, silicone or other polymeric material. In yet further aspects, the seal 74 is adhered to the storage compartment 20 or door 26 by an adhesive. In alternative or additional aspects, the seal 74 is adhered to the storage compartment 20 or door 26, by mechanical fasteners. Positioning the seal 74 around the opening 70, rather than in the opening 70, prevents interference in the opening 70 by the seal 74.

Figure 8A:
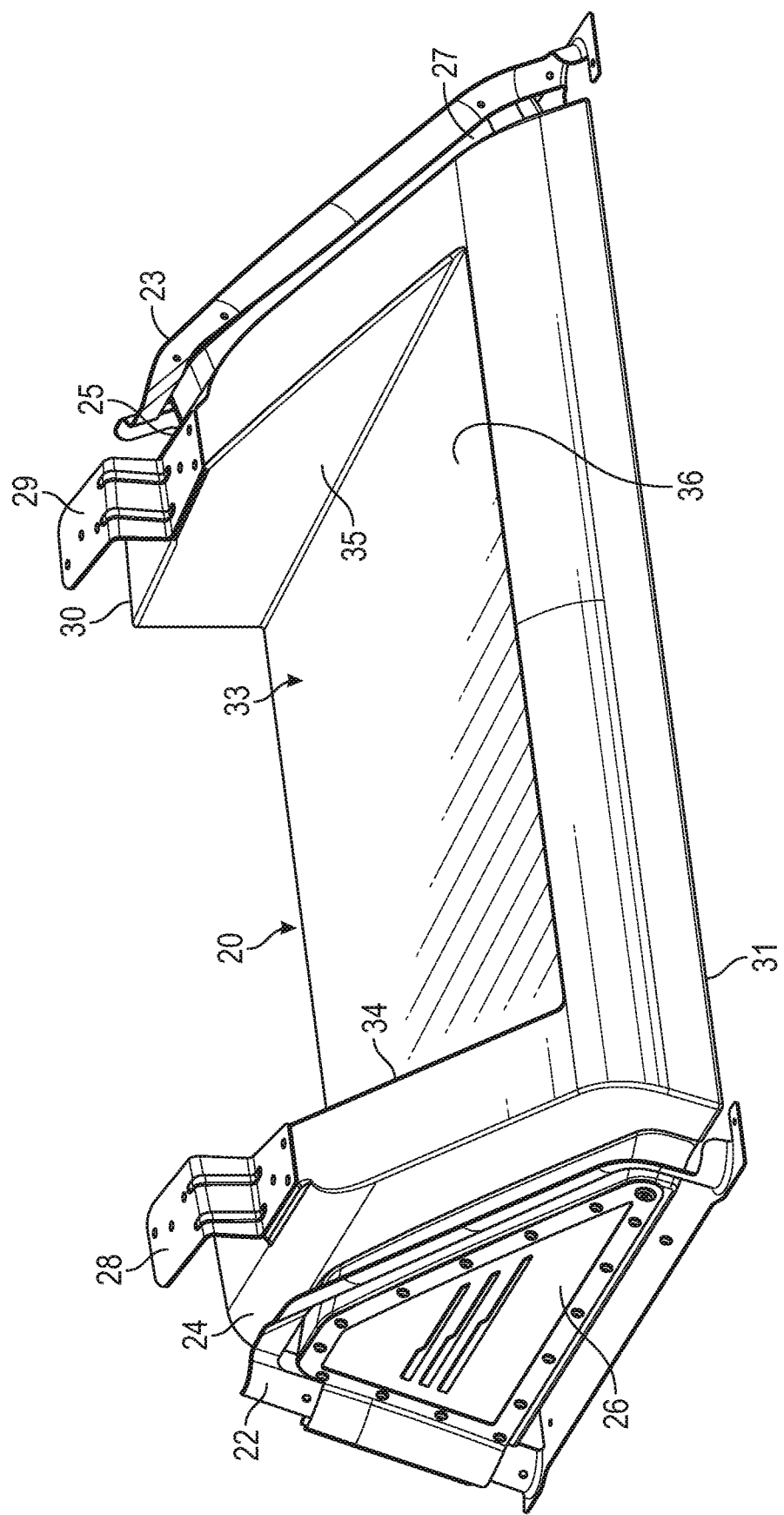
FIG. 8a rear perspective view of a sports bar storage compartment according to an exemplary embodiment.

Located underneath the opening 70, in the recess portion 73 against the storage compartment wall 21, is a reinforcement bracket 76. In aspects, the reinforcement bracket 76 runs at least a portion of, and preferably the full length of the storage compartment 20 from front to back (see 37 and 38, respectively, in FIG. 8). In aspects, the reinforcement bracket 76 serves as a latch engagement. The reinforcement bracket 76 is illustrated as "L" shaped; however, the reinforcement bracket 76 may assume other alternative configurations, such as being a straight bar. In addition, the reinforcement bracket 76 is illustrated as being connected to the bottom 31 of the storage compartment 20 by one or more mechanical fasteners 78, such as a nut and bolt. However, depending on the geometry, the reinforcement bracket 76 may be affixed only to the storage compartment wall 21 in alternative aspects. Further, alternative or additional mechanical fasteners may be utilized. It is further noted that the storage compartment 20 may be connected to the support shelf 40 using one or more mechanical fasteners, such mechanical fastener 78, or other mechanical fasteners. In such aspects, the reinforcement bracket 76 assists in stabilizing the storage compartment 20 relative to the support shelf 40. In yet further alternative aspects, the reinforcement bracket 76 serves as the bottom wall 31 of the compartment 20, spanning the width W of the bed volume V and attached to the attachment brackets 22, 23.

Figure 7:
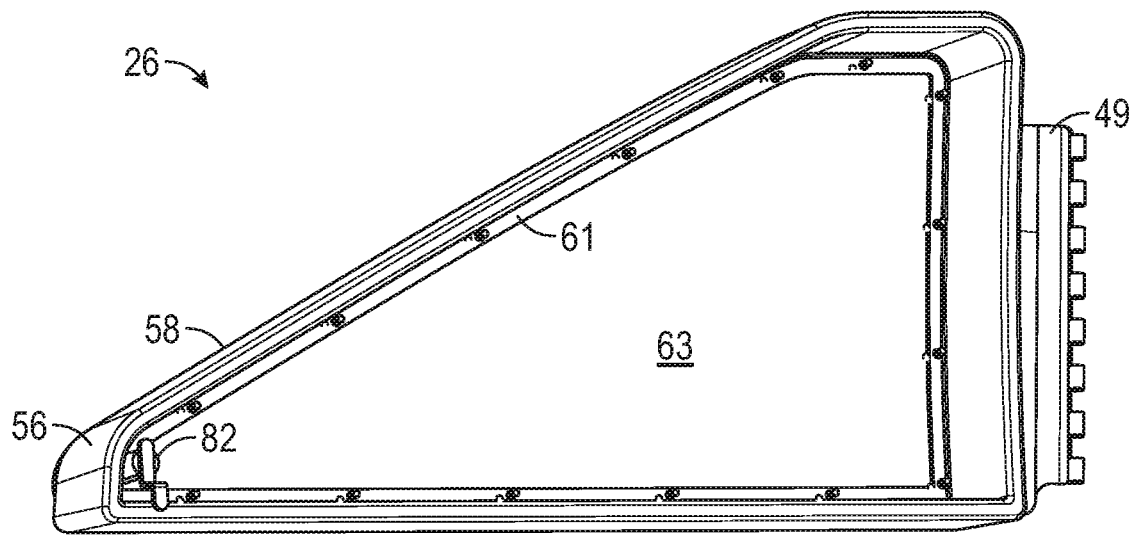
FIG. 7 is a perspective view of the sports bar storage compartment door according to an exemplary embodiment.

In aspects, the door 26 is held in a closed position by a latch 82, which is illustrated in FIGS. 5b, 6, and 7. The latch 82 is coupled to the door 26 and the latch 82 engages the side wall 21 of the storage compartment 20. The illustrated latch 82 is a cam lock; however in alternative aspects other latches, such as a radial pin tumbler push lock, may be employed. As noted above, in aspects, the reinforcement bracket 76 serves as a latch engagement. While only one latch 82 is illustrated, multiple latches may be provided at various locations around the door 26. The latch 82 is connected to the door 26 and passed through both the exterior panel 54 and the reinforcement panel 55. Again, it may be appreciated that while the features noted above, such as the recess 73, seal 74, reinforcement bracket 76 and latch 82, are described with regard to the door 26 and opening 70, door 27 and opening 71 (if present) also include the noted features.

FIGS. 2 and 5 illustrate a configuration of the storage compartment 20, wherein the top 30 of the storage compartment 20 spans across the width W of the pick-up bed 16 from side wall 14 to side wall 14, covering at least 90% of the area of the rear window 17, including all values and ranges from 90% to 100%. In such a configuration, the view through the rear window 17 is blocked and, in aspects, a camera may be provided in the rear of the truck, e.g., to supply video feed to a rear-view screen located in the rear-view mirror or dash of the vehicle.

Alternative configurations of the storage compartment 20 may be provided. FIGS. 1 and 8a through 8c illustrate a cut-out configuration of the storage compartment 20, where a cut-out 33 is provided in the storage compartment 20, so that a degree of viewing is available through the rear window 17. In such aspects, the storage compartment 20 includes two cut-out side walls 34, 35 and a cut-out ledge 36 is formed between the cut-out side walls 34, 35 and the top 30 and bottom 31 of the storage compartment 20. The cut-out ledge 36 is lower in height than the top 30 of the storage compartment 20 relative to the bottom 31 of the storage compartment 20. In such aspects, the storage compartment 20 covers less than 90% of the area of the rear window 17, such as in the range of 10% to 80% of the area of the rear window 17.

Figure 8B:
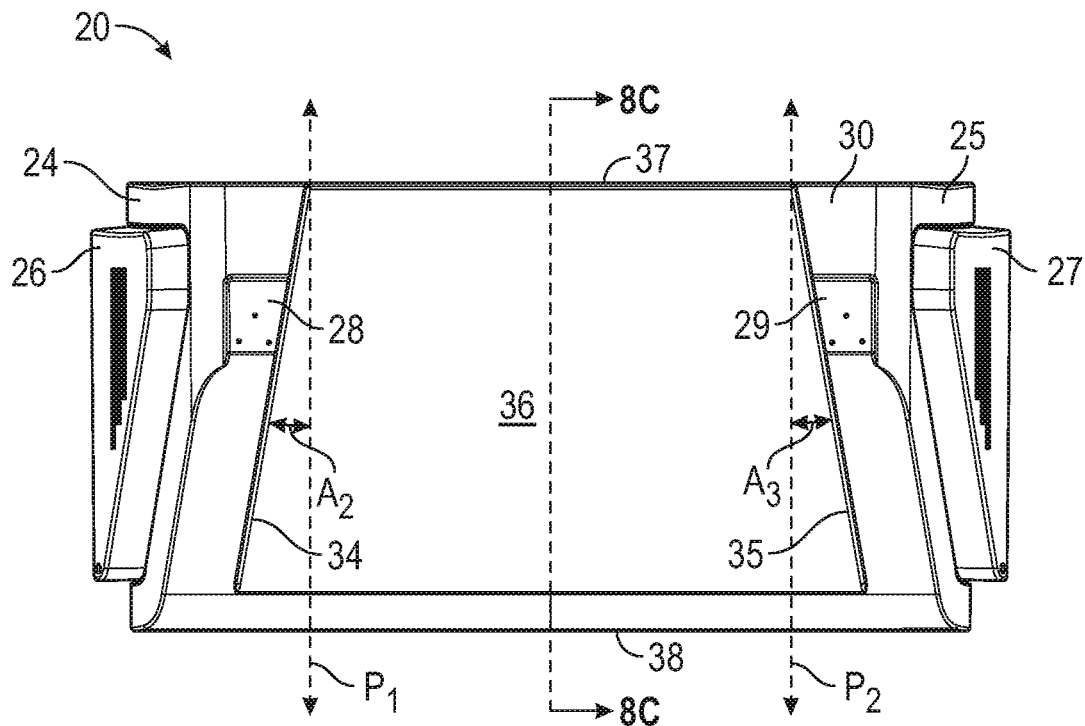
FIG. 8b is a top view of the sports bar storage compartment according to an exemplary embodiment

In aspects, the cut-out side walls 34, 35 and cut-out ledge 36 are angled such that the profile of the cut-out 33 is relatively larger towards the rear of the vehicle. FIG. 8b illustrates a top view of the storage compartment 20. As illustrated, the first cut-out side wall 34 is angled at an angle A2, from a plane P1 and the second cut-out side wall 35 is angled at an angle A3 from plane P2. Planes P1 and P2 are parallel, extend from the front 37 of the storage compartment to the rear 38 of the storage compartment 20, and extend perpendicular to the rear window 17 and the width W of the pick-up bed 16. In further aspects, angles A2 and A3 are sufficient to provide a viewing angle out the rear window 17 in accordance with the laws of various regions. In yet further aspects, angles A2 and A3 are each selected from an angle in the range of 1 to 20 degrees, including all values and ranges therein, such as 10 degrees, 15 degrees, etc. In aspects, the angle A3 of the second cut-out side wall 35 mirrors the angle A2 of the first cut-out side wall 34. In alternative aspects, the second cut-out side wall 35 is angled at an angle that is greater than or less than the angle A2.

Figure 8C:
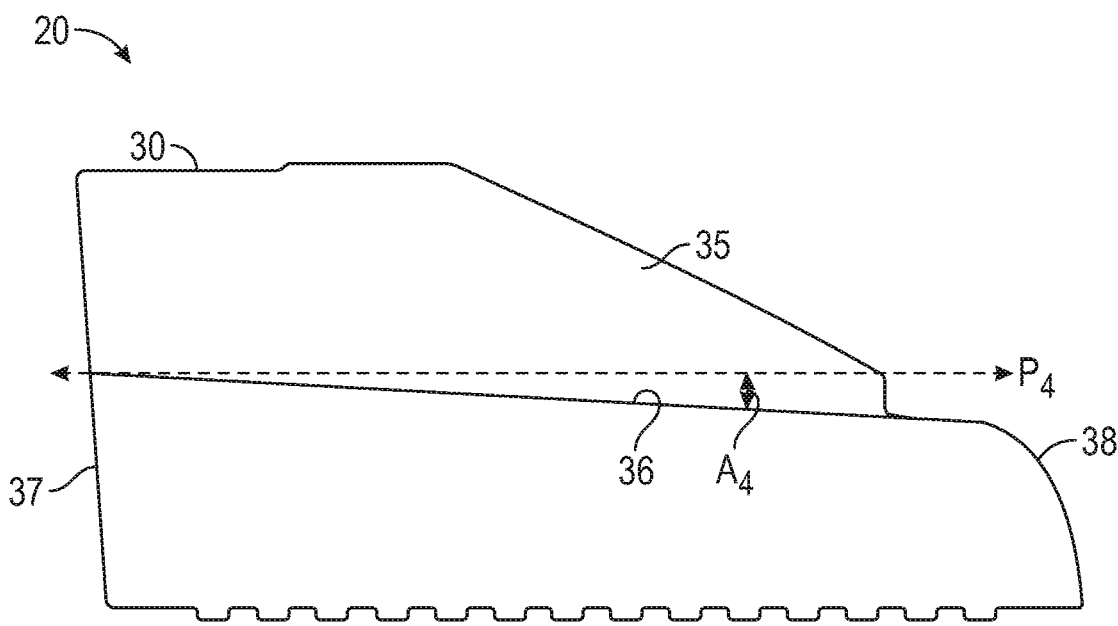
FIG. 8c is a cross-sectional view of the sports bar storage compartment according to an exemplary embodiment.

FIG. 8c illustrates a cross-section of plane 8c of FIG. 8b and the angle A4 of the cut-out ledge 36. The angle A4 of the cut-out ledge 36 is relative to a plane P4 that extends from the front 37 of the storage compartment 20 to the back 38 of the storage compartment 20 and parallel to the width W of the pick-up bed 16. Again, in aspects, the angle A4 is sufficient to provide a viewing angle out the rear window 17 in accordance with the laws of various regions. In further aspects, the angle A4 is in the range of 1.0 to 20.0, including all values and ranges therein, such as 2.0 to 4.0 or 2.6.

Figure 9:
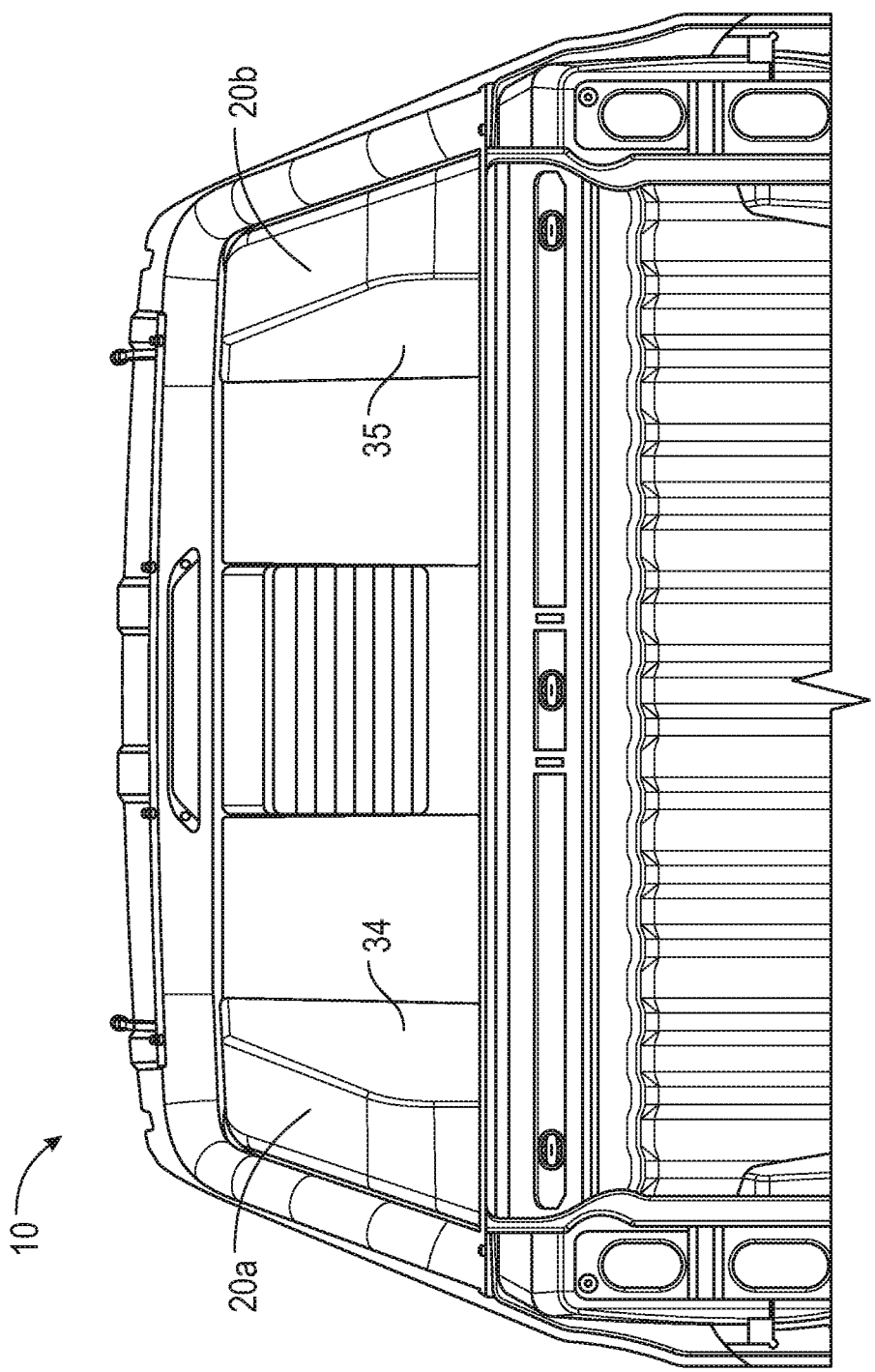
FIG. 9 is a rear view of sports bar storage compartments according to an exemplary embodiment.

In other aspects, such as illustrated in FIG. 9, more than one storage compartment 20a, 20b may be provided. In such aspects, the cut-out walls 34, 35 extend the entire height of each storage compartment 20a, 20b. Similar to the aspects illustrated in FIG. 8b, the cut-out walls 34, 35 may be set at an angle. In addition, the other features, including the doors 26, 27, door seals 74, attachment brackets 22, 23, etc., are as described above. If only one storage compartment 20a or 20b is provided, then only one attachment bracket 22 or 23 may be provided and only one upper bracket 28 or 29 may be provided as well.

In any of the above configurations, the storage compartment 20 is a unitary piece or formed from multiple components. For example, if formed of a unitary piece, the storage compartment 20 may be blow-molded from a polymer material. If more than one piece, an upper portion of the storage compartment 20 may be vacuum formed, thermoformed, or otherwise molded from a polymer material and a lower portion may be formed from a polymer material, a metal, or metal alloy, such as an aluminum extrusion.

In yet further aspects, modifications may be made to the bracket and storage compartment to provide clearance for pick-up box covers (such as tonneau covers) or other accessory features of the pick-up truck 10.

In aspects, a method of installing the sports bar storage compartment 20 includes removing any side trim plates that may be connected to the sports bar 12. At least one of the attachment brackets 22, 23 and doors 26, 27 are connected to the sports bar 12. It is noted that if holes are present from the side trim plates, those holes may be utilized to fasten the attachment brackets 22, 23 on the vertical posts 13 of the sports bar 12 and additional holes need not be drilled. Mechanical fasteners 78 may be used to connect the attachment brackets 22, 23 onto the sports bar 12, as would be understood by a person of ordinary skill in the art.

In aspects, the storage compartment 20, 20a, 20b, is then slid into place besides the sports bar and onto the support shelf 40, wherein the opening 70, 71 is adjacent to the attachment bracket 22, 23. The storage compartment 20, 20a, 20b is then fastened into place on the support shelf 40. If used, the upper brackets 28, 29 are then fastened to the cross members 15 of the sports bar 12 and to the storage compartment 20, 20a, 20b. Then alignment of the doors 26, 27 and storage compartment 20, 20a, 20b is then verified to make sure the doors 26, 27 open and close properly and all the fasteners are then torqued down to securely fasten the storage compartment assembly 18 into place.

A sports bar storage compartment of the present disclosure offers several advantages. These include taking advantage of the space between the sports bar assembly by being suspended between existing sports bars that does not reduce available volume within the pickup box bed. These also include relatively easy access to items made possible by the side mounted doors, eliminating the need to stand in the bed of the truck to unload and load items in the storage compartment. These yet also include the ability to store items securely. These further include the ability to store relatively longer items, such as fishing poles, rakes, shovels, or taller jacks. These yet further include installation without drilling or removal of the sports bar assembly. These yet further include the provision of this accessory of an aftermarket accessory. These yet further include the ability to adjust the design to accommodate existing pick-up box covers. These yet further include the ability to install the compartment without disassembly of the sports bar.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A sports bar storage compartment assembly, comprising:
    a storage compartment including a storage compartment wall defining a first side, a second side, a top and a bottom;
    an opening defined in the storage compartment wall at the first side of the storage compartment;
    a recess defined in the first side of the storage compartment wall around the opening, wherein the opening is defined in the recess;
    a first attachment bracket configured to mount to a sports bar, wherein the first attachment bracket includes a support shelf, the storage compartment is connected to the support shelf, and the first attachment bracket is positioned adjacent to the opening;
    a door connected to the first attachment bracket, wherein the door conceals the opening within the recess and extends outward from the recess and the storage compartment wall when the door is in a closed position; and
    a seal disposed on the storage compartment around the opening, wherein the seal is sandwiched between the door and the storage compartment wall when the door is in the closed position.

2. The sports bar storage compartment assembly of claim 1, wherein the first attachment bracket further includes two uprights extending upward from opposing sides of the support shelf.

3. The sports bar storage compartment assembly of claim 2, wherein the first attachment bracket further includes a cross member joining the two uprights distal from the support shelf.

4. The sports bar storage compartment assembly of claim 2, wherein the uprights of the first attachment bracket are connected to the sports bar.

5. The sports bar storage compartment assembly of claim 2, wherein the door is connected to one of the uprights of the first attachment bracket with a hinge, wherein a center point of the hinge is located on an opposing side of the upright from the opening defined in the storage compartment.

6. The sports bar storage compartment assembly of claim 5, wherein the hinge includes a hinge stop configured to stop rotation of the door beyond a first angle from the closed position.

7. The sports bar storage compartment assembly of claim 1, wherein the door includes an exterior panel that defines a periphery and an exterior side wall extending around the periphery, wherein the exterior panel defines a volume.

8. The sports bar storage compartment assembly of claim 7, wherein a reinforcement panel is located inside the volume, wherein the reinforcement panel defines a reinforcement panel periphery and the reinforcement panel includes an interior side wall extending around the reinforcement panel periphery.

9. The sports bar storage compartment assembly of claim 1, further including a latch coupled to the door, wherein the storage compartment wall is engage-able by the latch.

10. The sports bar storage compartment assembly of claim 9, further including a reinforcement bracket positioned against the storage compartment wall within the storage compartment below the opening and wherein the reinforcement bracket is engage-able by the latch.

11. The sports bar storage compartment assembly of claim 1, further including a reinforcement bracket positioned against the storage compartment wall within the storage compartment below the opening, wherein the reinforcement bracket is connected to the bottom of the storage compartment and the support shelf of the first attachment bracket.

12. The sports bar storage compartment assembly of claim 1, wherein the recess extends down to the bottom of the storage compartment.

13. The sports bar storage compartment assembly of claim 1, wherein the door contacts the seal within the recess when in the closed position.

14. The sports bar storage compartment assembly of claim 1, wherein the storage compartment includes at least two cut-out side walls located between the first side and the second side of the storage compartment and a cut-out ledge formed between the cut-out side walls, wherein the cut-out ledge is lower in height than the top of the storage compartment relative to the bottom of the storage compartment.

15. The sports bar storage compartment assembly of claim 1, further comprising a second attachment bracket including a support shelf, wherein the storage compartment is connected to the second attachment bracket near the second side of the storage compartment.

16. The sports bar storage compartment assembly of claim 1, further comprising at least one upper bracket connected to the top of the storage compartment, wherein the upper bracket is configured to connect the sports bar storage compartment assembly to the sports bar.

17. A vehicle, comprising:
a pick-up box including at least two side walls;
a sports bar mounted to the two side walls; and a storage compartment assembly connected to the sports bar, the storage compartment assembly including:
a storage compartment including a storage compartment wall defining a first side, a second side, a top and a bottom;
an opening defined in the storage compartment wall at the first side of the storage compartment;
a recess defined in the first side of the storage compartment wall around the opening, wherein the opening is defined in the recess;
a first attachment bracket mounted to a sports bar, wherein the first attachment bracket includes a support shelf, the storage compartment is connected to the support shelf, and the first attachment bracket is near the first side and adjacent to the opening defined in the storage compartment wall;
a door connected to the first attachment bracket, wherein the door conceals the opening and extends outward from the recess and the storage compartment wall when the door is in a closed position; and
a seal disposed on the storage compartment around the opening, wherein the seal is sandwiched between the door and the storage compartment wall when the door is in the closed position.

18. The vehicle of claim 17, further comprising a rear window, wherein the top of the storage compartment spans across a width of the pick-up box between the two side walls and blocks the rear window.

19. The vehicle of claim 17, further comprising a rear window, wherein the storage compartment includes at least two cut-out side walls located between the first side and the second side of the storage compartment and a cut-out ledge formed between the cut-out side walls, wherein the cut-out ledge is lower in height than the top of the storage compartment relative to the bottom of the storage compartment, and wherein the storage compartment blocks a portion of the rear window.

20. A method of installing a sports bar storage compartment, comprising:
removing, if present, a side trim plate connected to a sports bar;
connecting a first attachment bracket to the sports bar, wherein the first attachment bracket includes a support shelf and a door;
sliding a storage compartment onto the support shelf, wherein the storage compartment includes a top, a bottom, a first side and a second side and defines an opening in the first side and the storage compartment further defines a recess in the first side of the storage compartment wall around the opening, wherein the opening is defined in the recess, and the opening is positioned adjacent to the first attachment bracket; and
connecting the storage compartment to the support shelf proximal to the opening, wherein the door conceals the opening and extends outward from the recess and the storage compartment wall when the door is in a closed position and a seal is sandwiched between the door and the storage compartment wall when the door is in the close position.

* * * * *